United States Patent
Jokinen et al.

(10) Patent No.: US 9,128,925 B2
(45) Date of Patent: Sep. 8, 2015

(54) SYSTEM AND METHOD FOR DIRECT MEMORY ACCESS BUFFER UTILIZATION BY SETTING DMA CONTROLLER WITH PLURALITY OF ARBITRATION WEIGHTS ASSOCIATED WITH DIFFERENT DMA ENGINES

(75) Inventors: Tommi M. Jokinen, Austin, TX (US); David B. Kramer, Cedar Park, TX (US); Kun Xu, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 225 days.

(21) Appl. No.: 13/454,505

(22) Filed: Apr. 24, 2012

(65) Prior Publication Data

US 2013/0282933 A1    Oct. 24, 2013

(51) Int. Cl.
*G06F 13/14* (2006.01)
*G06F 13/28* (2006.01)

(52) U.S. Cl.
CPC ...................... *G06F 13/28* (2013.01)

(58) Field of Classification Search
CPC ....................................... G06F 13/28
USPC .................................... 710/20–25
See application file for complete search history.

(56) References Cited

U.S. PATENT DOCUMENTS

| | | | |
|---|---|---|---|
| 5,109,501 A | 4/1992 | Kaneko et al. | |
| 5,386,532 A | 1/1995 | Sodos | |
| 5,644,787 A | 7/1997 | Nakamura et al. | |
| 5,675,751 A * | 10/1997 | Baker et al. | 710/305 |
| 5,761,537 A | 6/1998 | Sturges et al. | |
| 5,832,308 A | 11/1998 | Nakamura et al. | |
| 5,948,080 A | 9/1999 | Baker | |
| 5,958,025 A | 9/1999 | Sonobe | |
| 6,026,443 A | 2/2000 | Oskouy et al. | |
| 6,199,121 B1 | 3/2001 | Olson et al. | |
| 6,449,666 B2 | 9/2002 | Noeldner et al. | |
| 6,557,052 B1 | 4/2003 | Kubo | |
| 6,731,644 B1 | 5/2004 | Epps et al. | |
| 6,857,031 B2 | 2/2005 | Kubo | |
| 6,915,357 B2 | 7/2005 | Kawase | |
| 7,007,111 B2 | 2/2006 | Sihlbom et al. | |
| 7,035,956 B2 | 4/2006 | Tanaka | |
| 7,305,499 B2 | 12/2007 | Furuta et al. | |
| 7,389,365 B2 * | 6/2008 | Gray et al. | 710/22 |
| 7,522,522 B2 | 4/2009 | Dropps et al. | |
| 7,689,732 B2 * | 3/2010 | Chen et al. | 710/22 |
| 7,765,339 B2 * | 7/2010 | Salessi et al. | 710/33 |
| 8,176,221 B2 | 5/2012 | Nagai et al. | |
| 8,417,842 B2 * | 4/2013 | Vu | 710/22 |
| 8,572,296 B2 * | 10/2013 | Shasha et al. | 710/22 |

(Continued)

OTHER PUBLICATIONS

Abts, D. et al., "Age-Based Packet Arbitration in Large-Radix k-ary n-cubes", SC '07 Proceedings of the 2007 ACM/IEEE conference on Supercomputing, 2007, 11 pages.

(Continued)

*Primary Examiner* — Tammara R Peyton (57) ABSTRACT

A DMA controller allocates space at a buffer to different DMA engines based on the length of time data segments have been stored at a buffer. This allocation ensures that DMA engines associated with a destination that is experiencing higher congestion will be assigned less buffer space than a destination that is experiencing lower congestion. Further, the DMA controller is able to adapt to changing congestion conditions at the transfer destinations.

20 Claims, 5 Drawing Sheets

(56) References Cited

U.S. PATENT DOCUMENTS

| | | | |
|---|---|---|---|
| 2002/0026544 A1 | 2/2002 | Miura | |
| 2003/0088718 A1 | 5/2003 | Higuchi | |
| 2003/0167368 A1 | 9/2003 | Tanaka | |
| 2005/0223136 A1 | 10/2005 | Tanaka et al. | |
| 2009/0037615 A1 | 2/2009 | Kodaira | |
| 2010/0293304 A1 | 11/2010 | Alexandron et al. | |

OTHER PUBLICATIONS

Guderian, F. et al., "Fair Rate Packet Arbitration in Network-on-Chip", SOC Conference (SOCC), 2011 IEEE International, Sep. 2011, pp. 278-283.

Guo, Z. et al., "Analysis of a Flow Control System for a Combined Input-Crosspoint Buffered Packet Switch", IEEE High Performance Switching and Routing, 2005, pp. 336-340.

Guo, Z. et al., "Framed Round-Robin Arbitration with Explicit Feedback Control for Combined Input-Crosspoint Buffered Packet Switches", Workshop on High Performance Switching and Routing, 2007, pp. 1-5.

Jiang, N. et al., "Performance Implications of Age-Based Allocation in On-Chip-Networks", Technical Report 129, Concurrent VLSI Architectures Group, Stanford University, May 2011, 21 pages.

Kornaros, G., "BCB: A Buffered CrossBar Switch Fabric Utilizing Shared Memory", Proceedings of the 9th EUROMICRO Conference on Digital System Design: Architectures, Methods and Tools, 2006, 6 pages.

Lee, M. et al., "Approximating Age-Based Arbitration in On-Chip Networks", Proceedings of the 19th international conference on Parallel architectures and compilation techniques, Jul. 10, 2009, 2 pages.

Lee, M. et al., "Probabilistic Distance-based Arbitration: Providing Equality of Service for Many-core CMPs", Proceedings of the 2010 43rd Annual IEEE/ACM International Symposium on Microarchitecture, 2010, 11 pages.

Lin, Y. et al., "VLSI Design of a Priority Arbitrator for Shared Buffer ATM Switches", 1997 IEEE International Symposium on Circuits and Systems, Hong Kong, 4 pages.

Rojas-Cessa, R., "High Performance Round-Robin Arbitration Schemes for Input-Crosspoint Buffered Switches", Workshop on High Performance Switching and Routing, 2004, 5 pages.

Song, Y. et al., "Distributed Resolution of Network Congestion and Potential Deadlock using Reservation-based Scheduling", IEEE Transactions on Parallel and Distributed Systems, 2005, 30 pages.

U.S. Appl. No. 13/106,703, filed May 12, 2011, entitled "System and Method for Scalable Movement and Replication of Data".

U.S. Appl. No. 13/168,331, filed on Jun. 24, 2011, entitled "Bandwidth Control for a Direct Memory Access Unit Within a Data Processing System".

Notice of Allowance mailed Jan. 18, 2013 for U.S. Appl. No. 13/168,331, 17 pages.

\* cited by examiner

| BUFFER SLOT ASSIGNMENT | TIME STORED | WRAP BIT |
|---|---|---|
| DMA ENGINE 0 | 0011 | 0 |
| DMA ENGINE 0, | 0001 | 0 |
| DMA ENGINE 1 | 1101 | 0 |
| DMA ENGINE 1 | 1000 | 1 |
| UNASSIGNED | N/A (NO DATA SEGMENT STORED) | N/A |
| DMA ENGINE 2 | 0001 | 1 |
| DMA ENGINE 0 | 0110 | 0 |
| DMA ENGINE 0 | 1000 | 0 |
| UNASSIGNED | N/A | N/A |

SYSTEM AND METHOD FOR DIRECT MEMORY ACCESS BUFFER UTILIZATION BY SETTING DMA CONTROLLER WITH PLURALITY OF ARBITRATION WEIGHTS ASSOCIATED WITH DIFFERENT DMA ENGINES

FIELD OF THE DISCLOSURE

The present disclosure relates generally to processors, and more particularly to direct memory access for processors.

BACKGROUND

A processor can employ a direct memory access (DMA) controller to relieve processor cores from the burden of managing data transfers. In response to data transfer requests from the processor cores, the DMA controller provides the requisite control information to the corresponding source and destination so that the data transfer requests are satisfied. Because the DMA controller handles the formation and communication of the control information, the processor cores are freed to perform other tasks while awaiting satisfaction of the data transfer requests.

BRIEF DESCRIPTION OF THE DRAWINGS

The present disclosure may be better understood, and its numerous features and advantages made apparent to those skilled in the art by referencing the accompanying drawings.

DETAILED DESCRIPTION

FIGS. 1-6 illustrate techniques for improving the efficiency of data transfers at a processor by allocating space at a buffer to different DMA engines based on the length of time data segments have been stored at the buffer. This allocation ensures that DMA engines associated with higher-bandwidth destinations are assigned more buffer space than those DMA engines associated with lower-bandwidth destinations, improving overall DMA efficiency. Further, the DMA controller is able to adapt to temporary congestion issues at selected transfer destinations.

To illustrate, a DMA controller includes a plurality of DMA engines that are individually assigned transfer descriptors for execution. Each transfer descriptor indicates a source, a destination, and a number of data segments to be transferred from the source to the destination. To execute a transfer, the assigned DMA engine waits until it has been assigned a slot in the buffer, then, based on the transfer descriptor, retrieves one of the data segments from the source and stores the data segment at the assigned buffer slot. In response to receiving an indication that the destination is ready to accept the data segment, the DMA engine retrieves the data from the buffer and provides it to the destination.

The speed with which each DMA engine can transfer data depends on at least two factors: 1) the rate at which buffer slots are assigned to the DMA engine; and 2) the rate at which the DMA engine receives indications that the destination is ready to accept a data segment. Destinations that provide such indications more frequently are referred to as high-bandwidth destinations, while destinations that provide such indications less frequently are referred to as low-bandwidth destinations. The bandwidth of a particular destination can vary over time. For example, temporary congestion at local buffers of a destination can result in a temporary lowering of the bandwidth at the destination.

It is generally more efficient to assign available buffer slots at the DMA controller's buffer to DMA engines associated with high-bandwidth destinations. As disclosed herein, the length of time that the oldest data segment associated with a particular DMA engine has been stored at the shared buffer provides an indication, at a given point in time, of the bandwidth associated with the DMA engine's destination. Accordingly, by assigning buffer slots at the shared buffer based on the relative amount of time that each DMA engine's oldest data segment has been stored at the shared buffer, the DMA controller is able to transfer data more efficiently.

Figure 1:
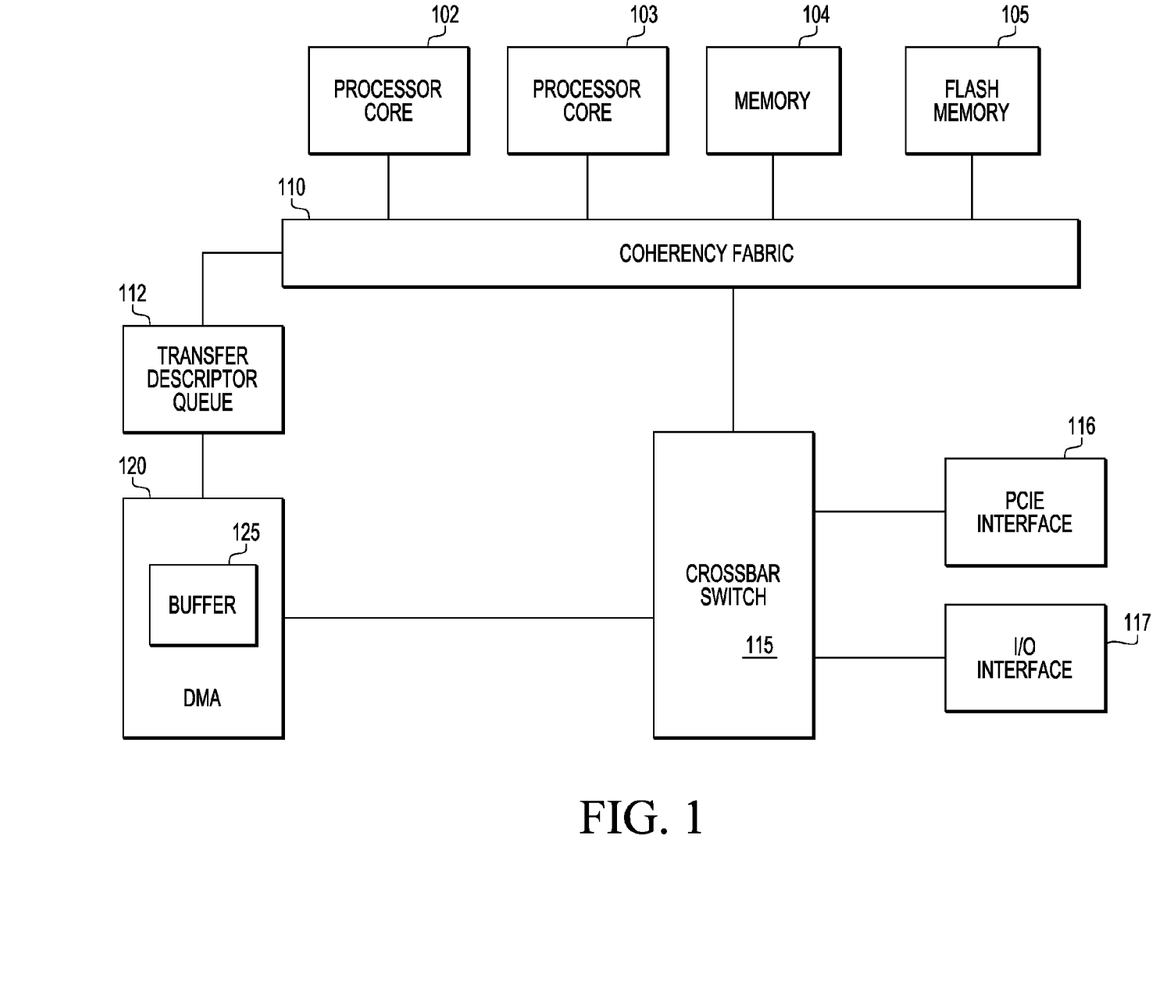
FIG. 1 is a block diagram illustrating a processor in accordance with one embodiment of the present disclosure.

FIG. 1 illustrates a processor 100 in accordance with one embodiment of the present disclosure. The processor 100 includes a number of processor cores 102 and 103, and memory devices including memory 104 and flash memory 105. The processor 100 also includes coherency fabric 110, a transfer descriptor queue 112, a crossbar switch 115, a Peripheral Component Interconnect Express (PCIE) interface 116, an input/output (I/O) interface 117, and a DMA controller 120. The processor cores 102 and 103, memory 104 and flash memory 105, transfer descriptor queue 112, and crossbar switch 115 are each connected to coherency fabric 110. The PCIE interface 116 and I/O interface 117 are each connected to the crossbar switch 115. The DMA controller 120 is connected to the crossbar switch 115 and the transfer descriptor queue 112.

The processor cores 102 and 103 are each configured to execute sets of instructions in order to carry out designated tasks. In the course of executing instructions, the processor cores 102 and 103 can generate transfer requests to transfer data from a source to a destination. Based on each transfer request, the processor cores 102 and 103 generate a corresponding transfer descriptor. Each transfer descriptor indicates the source, the destination, and the amount of data to be transferred. In an embodiment, the source and destination are each indicated by a corresponding address, and an amount of data is indicated by a number of data segments to be transferred, whereby each data segment has a defined length that represents the amount of data that can be transferred in a single transfer transaction. For example, in one embodiment each data segment is 256 bytes long. Therefore, a transfer descriptor to transfer 1 kilobyte of data will indicate a transfer of 4 data segments.

The memory 104 and the flash memory 105 can each be a transfer source or a transfer destination. In particular, memory 104 is a volatile memory, such as a random access memory (RAM) module, that stores and provides data in response to transfer requests. Accordingly, data can be stored at the memory 104 based on a data transfer wherein the memory 104 is the transfer destination, and data can be retrieved from the memory 104 based on a data transfer wherein the memory 104 is the transfer source. Flash memory 105 is a flash memory device that stores and provides data in response to transfer requests. In similar fashion to the memory 104, data can be stored or retrieved from the flash memory 104 based on transfers having the flash memory 104 as the destination or the source, respectively.

Other examples of transfer sources and destinations at the processor 100 include the PCIE interface 116 and the I/O interface 117. The PCIE interface 116 provides a physical and logical layer interface to one or more peripheral devices (not shown). Data can be provided to or retrieved from the peripheral devices via the PCIE interface 116 based on transfers that respectively identify the PCIE interface 116 as the destination or the source. The I/O interface 117 provides a physical and logical layer interface to one or more input and output devices (not shown). In similar fashion to the PCIE interface 116, data is retrieved and provided to the input and output devices based on data transfers that respectively identify the I/O interface 117 as the destination or the source of the transfer.

The coherency fabric 110 and the crossbar switch 115 provide the communication backbone for data transfers, as well as communication of other information such as transfer descriptors. In particular, the coherency fabric 110 provides a communication backbone for communications among the processor cores 102 and 103, the memory 104, the flash memory 105, the transfer descriptor queue 112, and the crossbar switch 115. The coherency fabric 110 can also manage the coherency of data between the processors 102 and 103, the memory 104, and the flash memory 105. For example, the coherency fabric 110 can maintain coherency state information, service coherency probes, and the like. The crossbar switch 115 is a switch fabric that can route communications among the DMA controller 120, the PCIE interface 116, the I/O interface 117, and the coherency fabric 110.

The transfer descriptor queue 112 stores the transfer descriptors. The DMA controller 120 is a module that can effectuate a data transfer based on the stored transfer descriptors. As described further herein with respect to FIG. 3, the DMA controller 120 includes a plurality of DMA engines, wherein each engine can manage a single transfer at a time. The DMA controller 120 assigns each transfer descriptor at the transfer descriptor queue to one of the DMA engines. The assigned DMA engine then retrieves the data segments from the source indicated by the descriptor, stores the data segments at a buffer 125 of the DMA controller 120, and forwards the stored data to the destination indicated by the descriptor.

The size of the buffer 125 limits the rate at which the DMA engines can retrieve and forward the data segments. In particular, the DMA engine will not retrieve the next data segment for a transfer until the DMA controller 120 has assigned space at the buffer 125 for the segment. The unit of buffer space that can be assigned to a data segment is referred to as a buffer slot. In one embodiment, the buffer 125 is configured so that each of the DMA engines is assigned two dedicated buffer slots, wherein only that DMA engine can use those buffer slots to store data segments. The buffer 125 is further configured to have a set of shared slots, wherein each of the shared slots can be assigned by the DMA controller 120 to any of the DMA engines.

In operation, one of the processor cores 102 and 103 can initiate a data transfer by storing a transfer descriptor at the transfer descriptor queue 112. Once a DMA engine is available to manage the transfer, the DMA controller 120 retrieves the transfer descriptor, and assigns the available DMA engine to manage the transfer. Upon receiving assignment of a buffer slot (either dedicated or shared), the DMA engine will retrieve a data segment from the source and store it at the slot. Upon receiving an indication from the destination that it is prepared to accept a data segment, the DMA engine will retrieve the oldest stored segment and provide it to the destination. In an embodiment, each DMA engine stores retrieved data segments in its dedicated slots first, then shared slots once its dedicated slots are filled.

The DMA controller 120 arbitrates between the DMA engines to assign buffer slots at the buffer 125 to each DMA engine that is managing a transfer. As described further herein, the DMA controller 120 employs a weighted round robin scheme to assign buffer slots to the DMA engines. A DMA engine that has a dedicated slot available to store a data segment receives the highest weight, guaranteeing that the engine will be assigned at least its dedicated slots. Once a DMA engine has filled its dedicated slots, it is given a weight for assignment of the shared slots at the buffer 125. The weight for the shared slots is based upon the length of time that the oldest data segment associated with the DMA engine has been stored at the buffer 125, in either a dedicated or shared slot. The longer the oldest data segment has been stored, the lower the weight assigned to the DMA engine, up to a minimum weight value. Thus, a DMA engine that has not been able to transfer its oldest segment for a longer period of time (indicating that the destination is experiencing congestion or is a relatively slow operating device) is given a lower weight than a DMA engine with a "younger" oldest segment. Because a DMA engine does not retrieve a data segment from the source until a buffer slot has been assigned for the segment, the weighted round robin scheme reduces the likelihood that a DMA engine associated with a slower data transfer will employ a large number of buffer slots and thereby slow other data transfers.

Further, the weighted round robin scheme can improve efficiency even when only one of the DMA engines is handling a transfer. In particular, if the weight for the engine drops to a sufficiently low level (because the oldest data segment has been pending for a threshold amount of time), the weighted round robin scheme will ensure that no more buffer space is assigned to the single DMA engine handling the transfer. This can be useful when, for example, the source and destination of the transfer being handled can share a data path, such as a transfer between one input/output device and another. In this case, reading data segments from the source too quickly can cause any congestion at the destination to worsen. By limiting the number of buffer slots assigned to the DMA engine, the speed of the transfer is throttled so that the congestion at the destination is not worsened.

Figure 2:
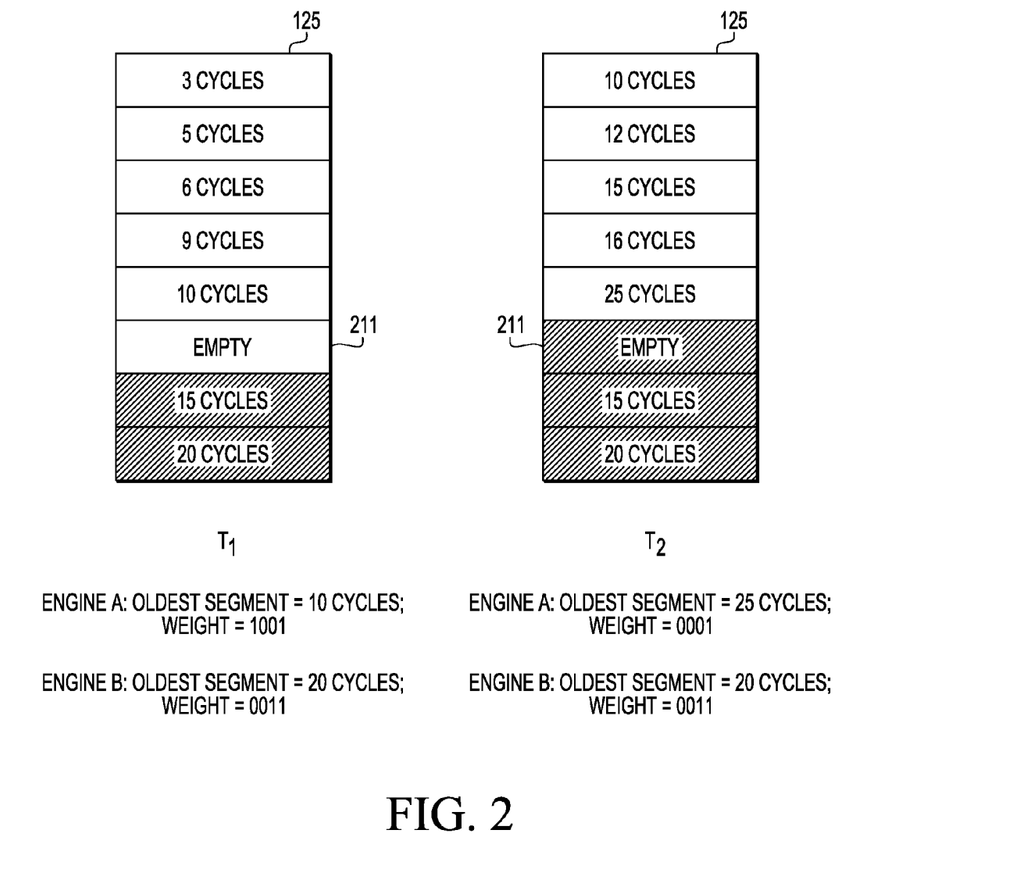
FIG. 2 is a block diagram illustrating example assignments of buffer slots at a DMA controller of the processor of FIG. 1 in accordance with one embodiment of the present disclosure.

FIG. 2 illustrates the assignment of buffer slots for two DMA engines, designated DMA engine A and DMA engine B, at times $t_1$ and $t_2$. At each of times $t_1$ and $t_2$, buffer slot 211 is available for assignment to one of DMA engines A and B. In the illustrated embodiment, buffer slots colored in lighter gray are assigned to DMA engine A while buffer slots colored in darker gray are assigned to DMA engine B. Further, each DMA slot indicates the length of time that the data segment stored at that slot has been stored.

It is assumed for purposes of discussion that for DMA engine A the destination of its transfer is the memory 104, while for DMA engine B the destination of its transfer is the flash memory 105. Further, it is assumed that the congestion at each destination varies over time, such that at time $t_1$ the memory 104 can process received data segments more quickly than the flash memory 105. At time $t_2$, the congestion at each destination has changed, such that the flash memory 105 can process received data segments more quickly.

Accordingly, at time $t_1$ the oldest data segment associated with DMA engine A has been stored at the buffer 125 for 10 cycles while the oldest data segment associated with DMA engine B has been stored for 20 cycles. The disparity in these storage times indicates that DMA engine A is currently able to transfer data to its destination more quickly than DMA engine B. Therefore, DMA engine A is assigned a higher weight than DMA engine A, resulting in assignment of buffer slot 211 to DMA engine A.

In the illustrated example, if at time $t_1$ DMA engines A and B were both given equal weight, as in a conventional arbitration scheme, the buffer slot 211 would be assigned to DMA engine B (because it has been assigned fewer slots at time $t_1$), even though DMA engine A is likely to make use of buffer slot 211 more quickly than DMA engine B. The efficiency of the transfer by DMA engine A is therefore reduced without a corresponding increase in the efficiency of the transfer by DMA engine B. Under the weighted round robin scheme illustrated at FIG. 2, the DMA engine that is able to transfer data more quickly is given priority for shared buffer slots, improving overall efficiency of the DMA controller.

At time $t_2$, because of reduced congestion at flash memory 105 or increased congestion at memory 104, or both, DMA engine B is able to transfer data at a higher rate. Accordingly, DMA engine B is given a higher weight for assignment of the buffer slot 211, so that it will be assigned the slot. Thus, relative changes in congestion at destinations can result in a change in the priority of slot assignments to each DMA engine.

Figure 3:
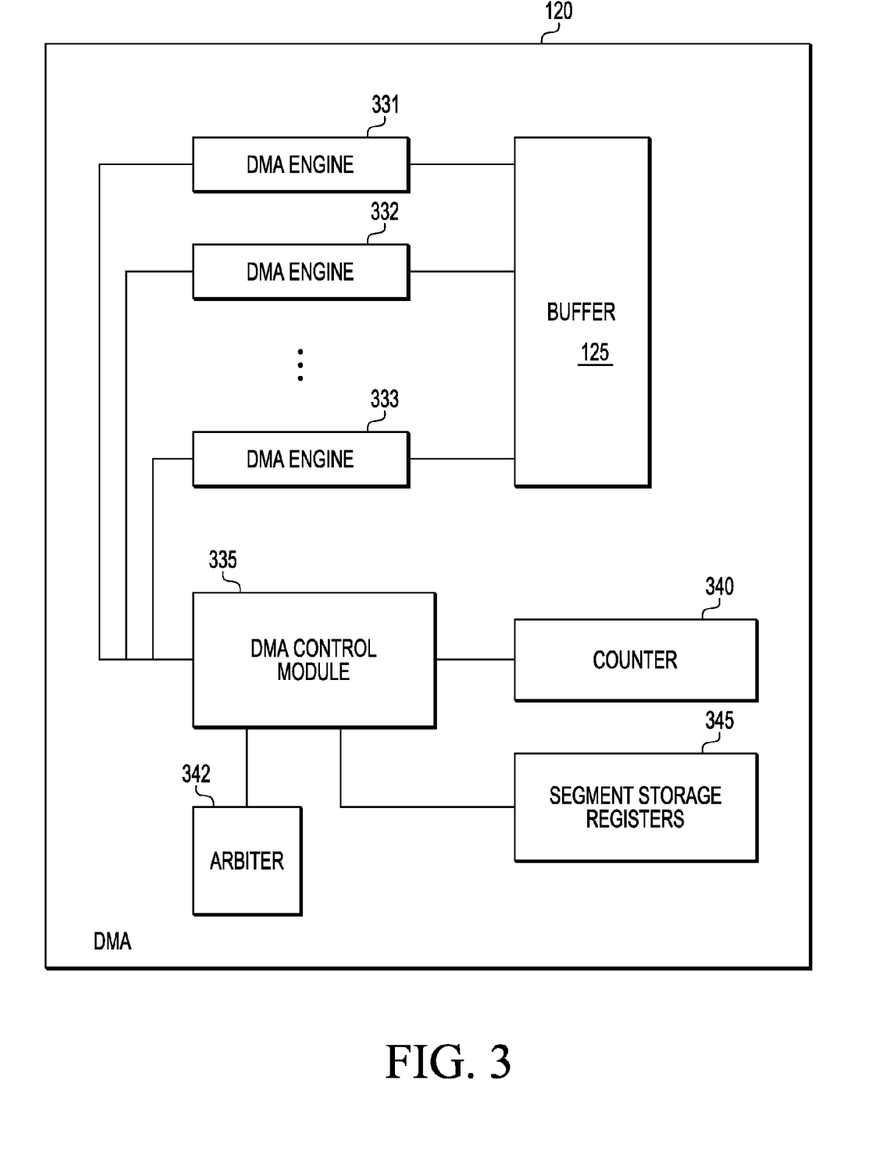
FIG. 3 is a diagram illustrating the DMA controller of FIG. 1 in accordance with one embodiment of the present disclosure.
Figure 4:
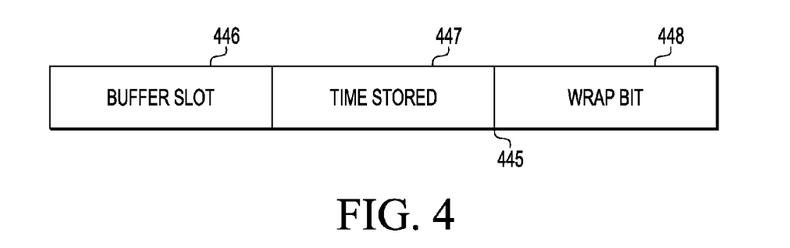
FIG. 4 is a block diagram of a segment storage register of FIG. 2 in accordance with one embodiment of the present disclosure.

FIG. 3 illustrates the DMA controller 120 in accordance with one embodiment of the present disclosure. DMA controller 120 includes the buffer 125, DMA engines 331-333, a DMA control module 335, a counter 340, an arbiter 342, and segment storage registers 345. The DMA engines 331-333 are each connected to the buffer 125 and are each connected to the DMA control module 335. In addition, the DMA control module 335 is connected to the counter 340, the arbiter 342, and the segment storage registers 345.

The DMA engines 331-333 are each configured to execute a transfer represented by a descriptor. Accordingly, each of the DMA engines can form the appropriate messages, control signaling, or any combination thereof, to retrieve data segments from a source, store the segments at assigned slots of the buffer 125, retrieve the stored segments, and provide the segments to the destination indicated by the transfer descriptor.

The DMA control module 335 manages the operations of the DMA controller 120. In particular, the DMA control module 335 can retrieve transfer descriptors from the transfer descriptor queue 112, determine which of the DMA engines 331-333 are available to execute a transfer, and assign each transfer descriptor to one of the DMA engines 331-333 for execution. In addition, the DMA control module 335 assigns slots at the buffer 125 to the DMA engines 331-333, and manages which of the buffer slots are dedicated slots and which are assigned slots. Further, the DMA control module 335 can determine how long each data segment stored at the buffer 125 has been stored, and assign the buffer slots to the DMA engine 331-333 based on this information. In one embodiment, the DMA control module 335 indicates that a slot has been allocated to a DMA engine by providing that engine with a pointer to the allocated. Each of the DMA engines 331-333 maintains a first-in first-out (FIFO) queue of pointers (not shown) recording which slots have been allocated to the engine. Accordingly, in response to receiving a pointer from the DMA control module indicating a slot has been allocated, the DMA engine stores the pointer at the FIFO queue. In response to transferring a data segment from one of its assigned slots, the DMA engine retrieves the pointer associated with the slot from the FIFO queue and returns the pointer to the DMA controller 335. This indicates to the DMA controller 335 that the slot is ready for reassignment.

In one embodiment, any particular buffer slot of the buffer 125 can be designated as dedicated or shared. For example, the DMA controller 120 can maintain a set of counters (not shown), with each counter associated with a different DMA engine. The values in the counter indicate the number of slots assigned to the associated DMA engine. Accordingly, if the maximum number of dedicated slots is fixed, the counter will indicate whether the associated DMA engine has used all of its assigned slots. For example, if the buffer 125 has a total of 16 slots, and DMA controller 120 has two DMA engines each having a maximum of four dedicated slots, a counter value of 6 for one of the DMA engines indicates that the DMA engine has been assigned all four of its dedicated slots, and has also been assigned two additional slots. If the counter value was 3, this would indicate that the DMA engine has one additional dedicated slot still available.

The counter 340 is a free running counter that stores a value that is incremented each cycle of a clock signal (not shown). Upon reaching a maximum value the stored value will reset to an initial value. For purposes of discussion, once the counter 340 has reached a particular value, reset to the initial value, and return to the start value, the counter 340 is said to have wrapped with respect to that value. Thus, if the counter 340 is a four bit counter that has a value of 1101 at a time $t_1$, is incremented until it reaches its maximum value of 1111, is reset to a reset value of 0000, and is incremented until it reaches the value 1101 again at time $t_2$, the counter is said to have wrapped with respect to the value 1101.

The segment storage registers 345 include one register for each buffer slot at the buffer 125. Each of the segment storage registers 345 stores information indicating how long data has been stored at the associated data slot. This can be better understood with reference to FIG. 4, which illustrates a segment storage register 445. The segment storage register 445 includes a buffer slot field 446, a time stored field 447, and a wrap bit 448. The buffer slot field indicates the buffer slot associated with the segment storage register 445. The time stored field 447 indicates the value of the counter 440 when the data segment stored at the buffer slot was stored. The wrap bit 446 is a bit that indicates whether the counter 440 has wrapped with respect to the value stored at the time stored field 447.

Returning to FIG. 3, the arbiter 342 determines a set of weights for each DMA engine 331-333 based on the age (the length of time stored) of the oldest data segment associated with the corresponding DMA engine stored at the buffer 125. In an embodiment, the arbiter 342 assigns an M-bit weight, where M is an integer, to each of the DMA engines 331-233 as follows: if the DMA engine has an available dedicated slot at the buffer 125, the M-bit weight for the DMA engine is set to a defined maximum value (e.g. all ones). If no dedicated slot is available and the wrap bit is set for the buffer slot storing the oldest data segment associated with the DMA engine is set to a defined minimum value (e.g. all zeros). If no dedicated slot is available for the DMA engine and the wrap bit for the oldest data segment is not set, the weight is set to the inverse of the age of the oldest data segment for the DMA engine, where age is calculated as the difference between the value stored at the time stored field for the buffer slot and the current value at the counter 340.

For example, assume that the buffer slot storing the oldest data segment for DMA engine 231 has a time stored field value of 0001. Further assume that the wrap bit for the buffer slot is not set, and that there are no dedicated slots available for DMA engine 1. Accordingly, the 4-bit weight for DMA engine 231 is: inverse(1010+inverse(0001))=0111.

Figure 5:
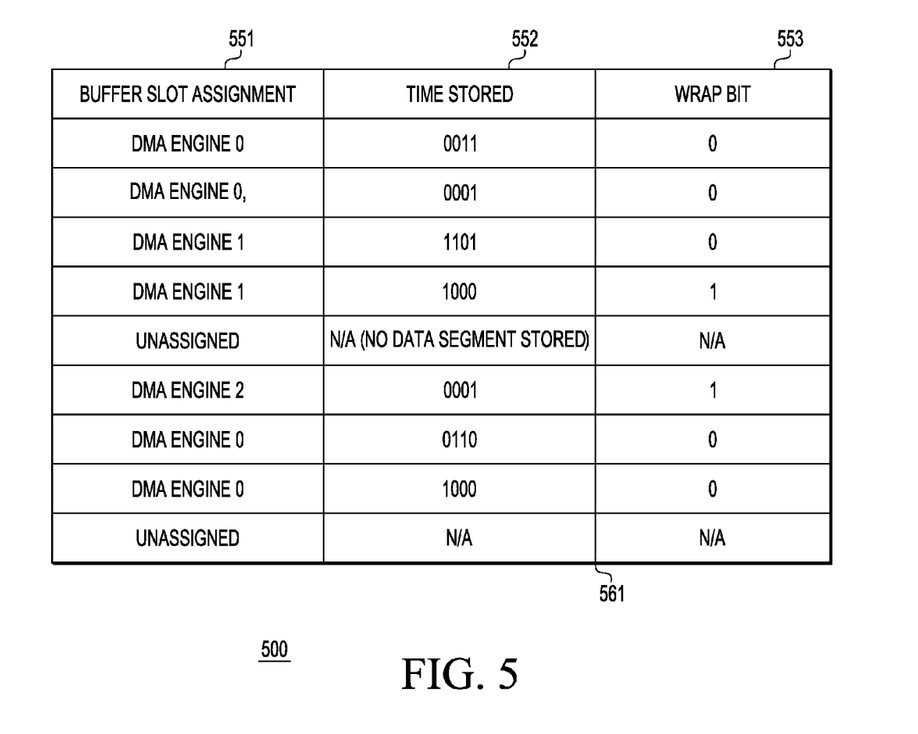
FIG. 5 is a block diagram illustrating an example operation of the DMA controller of FIG. 3 in accordance with one embodiment of the present disclosure

FIG. 5 illustrates a table 500 showing the assignment of selected buffer slots at the buffer 125 in accordance with one embodiment of the present disclosure. Column 551 of table 500 indicates to which, if any, of the DMA engines the buffer slot is assigned, and whether the buffer slot is designated as a dedicated slot or a shared slot. Column 552 indicates the time stored at the associated buffer slot, as indicated by the time stored field of the corresponding storage segment register. Column 553 indicates whether the wrap bit is set at the storage segment register for the associated buffer slot. Thus, row 561 of table 500 indicates that the associated buffer slot is assigned to DMA engine 0, has a segment age of 0011, and the wrap bit for the segment is not set.

Table 500 provides an example of how weights can be determined to assign shared buffer slots at buffer 125. In the example, it is assumed that the current value of the counter is 1010, and that each DMA engine is assigned two dedicated buffer slots. It is further assumed that each DMA engine has a maximum of two dedicated slots available to it. Accordingly, in the illustrated embodiment, DMA engine 0 has been assigned 4 slots, and therefore is using all of its dedicated slots (as well as two shared slots). In addition, the oldest data segment for DMA engine zero was stored at time 0001, and the wrap bit is not set for the oldest data segment. Accordingly, the 4-bit weight for DMA engine 0 is: inverse(1010+inverse(0001))=0111.

For DMA engine 1, it is using two slots, and therefore all of its dedicated slots are in use. The oldest data segment for DMA engine zero was stored at time 1000, with the wrap bit set. Because the wrap bit is set, the oldest data segment has been awaiting transfer for longer than a threshold period of time, where the threshold is determined by the size of the counter in bits. Accordingly, the 4-bit weight for DMA engine 1 is set to a minimum weight of 0000.

For DMA engine 2, the oldest data segment was stored at time 0001, with the wrap bit set. However, DMA engine 2 is only using one slot, and therefore has an additional dedicated slot available. Accordingly, the 4-bit weight for DMA engine 2 is set to a maximum value of 1111. DMA engine 2 is therefore guaranteed to be assigned its available dedicated slot by arbiter 342.

Figure 6:
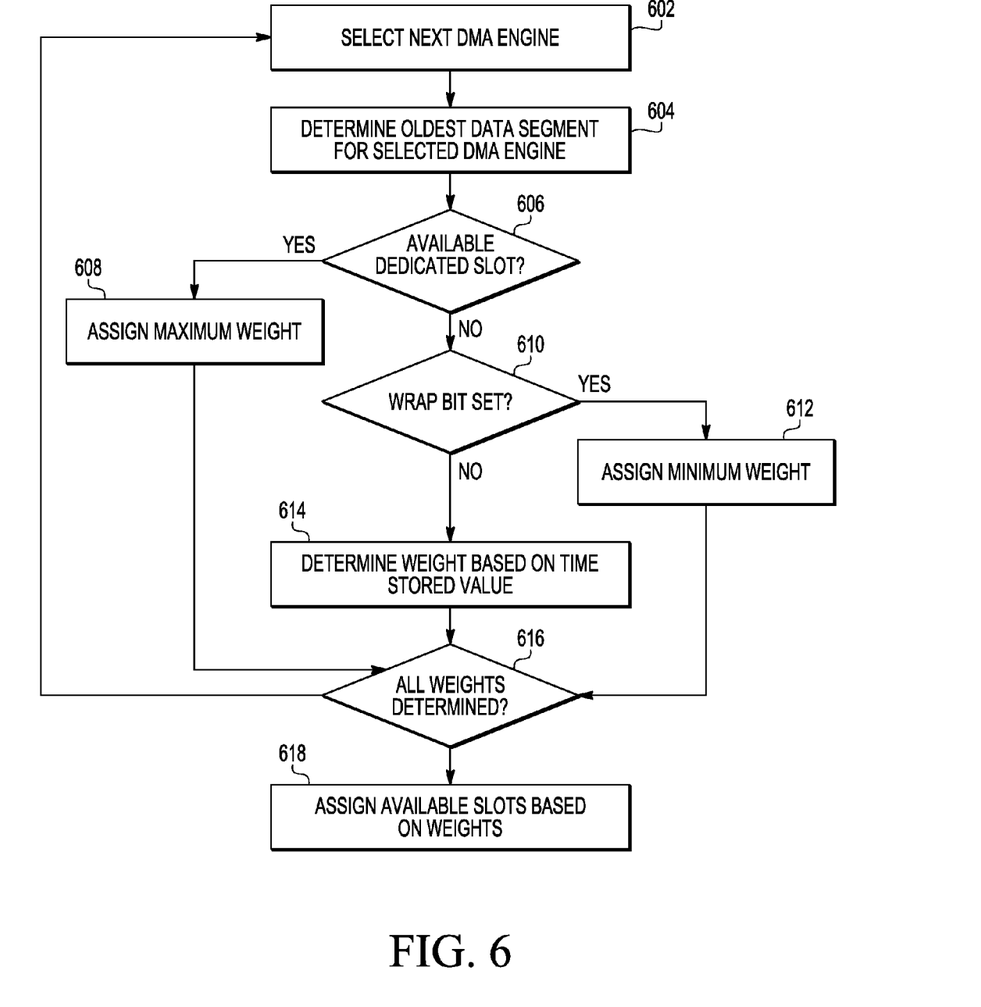
FIG. 6 is a flow diagram of a method of allocating shared buffer space at the DMA controller of FIG. 3 in accordance with one embodiment of the present disclosure.

FIG. 6 illustrates a flow diagram of a method of assigning buffer slots at the buffer 125 in accordance with one embodiment of the present disclosure. At block 602, the DMA control module 335 determines that a buffer slot is available for assignment to a DMA engine. In response, the DMA control module 335 begins determination of weights for each DMA engine that is executing a transfer. The DMA control module 335 selects one of the DMA engines and proceeds to block 604 to determine the oldest data segment associated with the selected DMA engine that is stored at the buffer 125. In particular, the DMA control module 335 accesses the segment storage registers and determines, based on the time stored field and wrap bits for each buffer slot, the oldest data segment associated with the selected DMA engine.

At block 606, the DMA control module 335 determines if there is an available buffer slot that is dedicated to the selected DMA engine. If so, the method flow moves to block 608 and the arbiter 342 assigns a defined maximum value weight to the selected DMA engine. The method flow proceeds to block 616, where the DMA controller 335 determines if all of the DMA engines that are executing transfers have been assigned weights. If so, the method flow moves to block 618 and the DMA controller 335 assigns the available buffer slots at the buffer 125 based on the determined weights. If, at block 616, it is determined that a weight has not been assigned to a DMA engine that is executing a transfer, the method flow returns to block 602 where the DMA control module 335 selects another DMA engine for weight determination.

Returning to block 606, if there are no available dedicated slots for the selected DMA engine, the method flow moves to block 610 and the DMA control module 335 determines whether the wrap bit is set for the oldest data segment determined at block 604. If the wrap bit is set, the oldest data segment has been stored for greater than a threshold amount of time, indicating that the DMA engine's destination is experiencing high congestion. Accordingly, the method proceeds to block 612 and the arbiter 342 assigns a defined minimum value (e.g. 0) as the weight for the selected DMA engine. The method flow proceeds to block 616, described above.

Returning to block 610, if the wrap bit for the oldest data segment is not set, the method flow moves to block 614 and the arbiter 342 determines a weight for the selected DMA engine based on the difference between the current value at the counter 340 and the time stored field of the corresponding stored segment register. For example, in one embodiment the arbiter 342 assigns the weight to be equal to the inverse of the difference. The method flow proceeds to block 616, described above.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed.

As used herein, the term "first" can refer to any selected item, and does not necessarily refer to first in time or first in a particular order.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:
1. A method, comprising:
 assigning space at a buffer of a direct memory access (DMA) controller to a first DMA engine based on the amount of time a first data segment has been stored at the buffer, the first data segment to be transferred by the first

DMA engine, the buffer to store data segments for a plurality of DMA engines including the first DMA engine.

2. The method of claim 1, further comprising:
assigning space at the buffer to a second DMA engine of the plurality of DMA engines based on the amount of time a second data segment associated with the second DMA engine has been stored at the buffer.

3. The method of claim 2 wherein assigning space at the buffer to the first DMA engine comprises assigning space at the buffer based on the relative amount of time the first and second data segments have been stored at the buffer.

4. The method of claim 1, further comprises assigning the space at the buffer to a second DMA engine instead of the first DMA engine in response to determining the first data segment has been stored at the buffer for greater than a threshold amount of time.

5. The method of claim 1, wherein assigning space at the buffer comprises:
determining the amount of time the first data segment has been stored based on the difference between a first counter value corresponding to a time when the space at the buffer becomes available and a second counter value corresponding to when the first data segment was stored at the buffer.

6. The method of claim 5, further comprising:
setting an indicator in response to determining a wrap of the counter with respect to the second counter value; and
assigning the space at the buffer to any of a plurality of DMA engines instead of the first DMA engine while the indicator is set.

7. The method of claim 1, wherein assigning the space at the buffer comprises assigning the space at the buffer in response to determining a dedicated portion of the buffer associated with the first DMA engine is not available to store a second data segment.

8. A method, comprising:
setting by a DMA controller each of a plurality of arbitration weights based on the corresponding amount of time that each of a plurality of data segments have been stored at a buffer of a direct memory access (DMA) controller, each of the plurality of weights associated with a different corresponding one of a plurality of DMA engines; and
assigning one or more spaces at the buffer to each of the plurality of DMA engines of the DMA controller based on the plurality of arbitration weights.

9. The method of claim 8, wherein setting the plurality of arbitration weights comprises:
setting by the DMA controller a first weight for a first DMA engine of the plurality of DMA engines based on the amount of time a first data segment of the plurality of data segments has been stored at the buffer; and
setting by the DMA controller a second weight for a second DMA engine of the plurality of DMA engines to be lower than the first weight in response to determining that a second segment of the plurality of data segments has been stored at the buffer for more time than the first data segment, the second data segment associated with the second DMA engine.

10. The method of claim 9, wherein setting the plurality of arbitration weights comprises:
setting the first weight to a defined value in response to determining the first data segment has been stored at the buffer for a threshold amount of time.

11. The method of claim 10, wherein determining the first segment has been stored at the buffer for the threshold amount of time comprises determining that a counter value has wrapped since the first data segment was stored at the buffer.

12. The method of claim 9, wherein setting the first weight further comprises setting the first weight based on the amount of time the first data segment has been stored at the buffer in response to determining a dedicated buffer slot associated with the first DMA engine is not available to store a second data segment.

13. The method of claim 12, wherein setting the plurality of arbitration weights further comprises setting the first weight to a defined value in response to determining that the dedicated buffer slot is available to store the second data segment.

14. A direct memory access (DMA) controller, comprising:
a plurality of DMA engines to execute data transfers;
a buffer comprising a plurality of buffer slots including a first buffer slot and a second buffer slot, the buffer to store data segments for the plurality of DMA engines; and
a control module to assign a buffer slot to one of the plurality of DMA engines based on an amount of time a plurality of data segments associated with the plurality of DMA engines have been stored at the buffer.

15. The DMA controller of claim 14, further comprising:
an arbiter to determine a set of weights based on the amount of time the plurality of data segments have been stored at the second buffer slot; and
wherein the control module is to assign the first buffer slot based on the set of weights.

16. The DMA controller of claim 15, wherein the arbiter is to set one of the plurality of weights to a defined value in response to determining one of the plurality of data segments has been stored at the buffer for a threshold amount of time.

17. The DMA controller of claim 16, further comprising a counter and wherein the arbiter is to determine that the one of the plurality of data segments has been stored at the buffer for the threshold amount of time in response to determining that a value at the counter wrapped since the one of the plurality of data segments was stored at the buffer.

18. The DMA controller of claim 15, wherein the arbiter is to set one of the plurality of weights to a defined value in response to determining that a buffer slot dedicated to the one of the plurality of DMA engines is available to store data.

19. The DMA controller of claim 14, wherein the control module assigns buffer slots based on the amount of time the oldest data segment associated with each of the plurality of DMA engines has been stored at the buffer.

20. The DMA controller of claim 14, further comprising a counter coupled to the control module, the control module to determine amount of time the plurality of data segments associated with the plurality of DMA engines have been stored at the buffer based on the counter.

* * * * *